United States Patent
Striebel et al.

[11] Patent Number: 6,165,641
[45] Date of Patent: Dec. 26, 2000

[54] NANODISPERSE TRANSITION METAL ELECTRODES (NTME) FOR ELECTROCHEMICAL CELLS

[75] Inventors: Kathryn A. Striebel, Oakland; Shi-Jie Wen, Sunnyvale, both of Calif.

[73] Assignee: The United States of America as represented by the United States Department of Energy, Washington, D.C.

[21] Appl. No.: 09/018,659

[22] Filed: Feb. 4, 1998

Related U.S. Application Data

[60] Provisional application No. 60/046,159, May 9, 1997.

[51] Int. Cl.$^7$ ............................... H01M 4/60; H01M 4/48
[52] U.S. Cl. ..................... 429/212; 429/213; 429/216; 429/232; 423/184
[58] Field of Search ..................... 429/212, 213, 429/216, 232; 423/55, 58, 69, 138, 183, 184, 598, 599

[56] References Cited

U.S. PATENT DOCUMENTS

| | | | |
|---|---|---|---|
| 3,945,847 | 3/1976 | Kordesch et al. | 136/100 |
| 4,146,685 | 3/1979 | Tulcholski | 429/286 |
| 4,160,747 | 7/1979 | Schneider et al. | 252/506 |
| 4,202,789 | 5/1980 | Saridakis | 252/182.1 |
| 4,218,523 | 8/1980 | Kalnoki-Kis | 429/101 |
| 4,507,371 | 3/1985 | Thackeray et al. | 429/191 |
| 4,687,598 | 8/1987 | Varma | 252/518 |
| 4,804,594 | 2/1989 | Jow et al. | 429/194 |
| 4,822,701 | 4/1989 | Ballard et al. | 429/192 |
| 4,865,927 | 9/1989 | Laig-Horstebrock et al. | 429/50 |
| 4,867,909 | 9/1989 | Babinec et al. | 252/518 |
| 4,980,251 | 12/1990 | Thackeray et al. | 429/224 |
| 5,001,023 | 3/1991 | Cheshire et al. | 429/94 |
| 5,114,811 | 5/1992 | Ebel et al. | 429/194 |
| 5,153,081 | 10/1992 | Thackeray et al. | 429/194 |
| 5,166,012 | 11/1992 | Rossouw et al. | 429/224 |
| 5,180,642 | 1/1993 | Weiss et al. | 429/90 |
| 5,219,680 | 6/1993 | Fauteux | 429/192 |
| 5,240,794 | 8/1993 | Thackeray et al. | 429/224 |
| 5,296,318 | 3/1994 | Gozdz et al. | 429/192 |

(List continued on next page.)

OTHER PUBLICATIONS

W.J. Macklin et al, "Performance of Lithium–Manganese Oxide Spinel Electrodes in a Lithium Polymer Electrolyte Cell", Journal of Power Sources 34 (1991) 39–49 (No Month).

Qingzhong Xu et al, "Rechargeable Li/LiMn2O4 Batteries with a polymeric solid electrolyte", Journal of Power Sources, 41 (1993) 315–320 (No Month).

R.J. Neat et al, "Manganese Dioxide as a Rechargeable Cathode in a High Temperature Polymer Electrolyte Cell", 2nd Int. Symposium Polymer Electrolytes, 1990 (No Month).

Striebel et al, Novel Nanodisperse Composite Cathode for Rechargeable Lithium/Polymer Batteries, Journal of Electrochemical Society, vol. 144, #5, May 1997.

The Electrochemical Society Program Information of 189th Meeting, Los Angeles California; at the web address www.electrochem.org/meetings/189/pib1.html, May 1996.

*Primary Examiner*—Carol Chaney
*Attorney, Agent, or Firm*—Randall W. Chang; William C. Daubenspeck; William R. Moser

[57] ABSTRACT

Disclosed are transition metal electrodes for electrochemical cells using gel-state and solid-state polymers. The electrodes are suitable for use in primary and secondary cells. The electrodes (either negative electrode or positive electrode) are characterized by uniform dispersion of the transition metal at the nanoscale in the polymer. The transition metal moiety is structurally amorphous, so no capacity fade should occur due to lattice expansion/contraction mechanisms. The small grain size, amorphous structure and homogeneous distribution provide improved charge/discharge cycling performance, and a higher initial discharge rate capability. The cells can be cycled at high current densities, limited only by the electrolyte conductivity. A method of making the electrodes (positive and negative), and their usage in electrochemical cells are disclosed.

44 Claims, 8 Drawing Sheets

U.S. PATENT DOCUMENTS

| | | | |
|---|---|---|---|
| 5,316,877 | 5/1994 | Thackeray et al. | 429/197 |
| 5,340,368 | 8/1994 | Koksbang et al. | 29/623.5 |
| 5,378,404 | 1/1995 | Han et al. | 252/500 |
| 5,409,786 | 4/1995 | Bailey | 429/52 |
| 5,435,874 | 7/1995 | Takeuchi et al. | 156/242 |
| 5,437,692 | 8/1995 | Dasgupta et al. | 29/623.1 |
| 5,512,389 | 4/1996 | Dasgupta et al. | 429/192 |
| 5,514,492 | 5/1996 | Marincic et al. | 429/194 |
| 5,523,179 | 6/1996 | Chu | 429/104 |
| 5,523,180 | 6/1996 | Armand et al. | 429/188 |
| 5,558,961 | 9/1996 | Doeff et al. | 429/224 |
| 5,580,683 | 12/1996 | Takeuchi et al. | 429/194 |
| 5,584,893 | 12/1996 | Mitchell | 29/623.5 |
| 5,584,979 | 12/1996 | Lewenstam et al. | 204/418 |
| 5,587,253 | 12/1996 | Gozdz et al. | 429/192 |
| 5,605,772 | 2/1997 | Yazami et al. | 429/190 |
| 5,614,331 | 3/1997 | Takeuchi et al. | 429/9 |

NANODISPERSE TRANSITION METAL ELECTRODES (NTME) FOR ELECTROCHEMICAL CELLS

CROSS-REFERENCE TO RELATED APPLICATIONS

This application claims the benefit of U.S. Provisional Application Ser. No. 60/046,159, filed May 9, 1997.

STATEMENT OF GOVERNMENT INTEREST

The United States Government has rights in this invention pursuant to Contract No. DE-AC03-76SF00098 between the U.S. Department of Energy and the University of California.

BACKGROUND OF THE INVENTION

The present invention relates generally to electrodes for electrochemical cells, and particularly to electrodes comprising a transition metal and an alkali metal incorporated into a polymer wherein the transition metal is homogeneously dispersed at the nano-scale within the polymer matrix with no crystalline structure detectable and the transition metal oxide has been formed directly in the polymer.

Description of Related Art

All-solid-state thin-film lithium/polymer rechargeable batteries have been the subject of active research and development in both academia and industry. Slow transport of $Li^+$ in the Mn oxide structure is often cited as a reason for the intrinsically poor charge/discharge performance of manganese-based positive electrodes in lithium/polymer rechargeable batteries. The main advantages of the all-solid-state polymer electrolyte cell over the competing lithium-ion battery technology, which utilizes a liquid organic electrolyte, is the overall stability of the electrolyte. The liquid electrolyte in the lithium-ion cell can evaporate on overheating due to over discharge or other mishandling. There is serious danger of ignition in the presence of high surface area metallic lithium which can form on the carbon negative electrode during the same mishandling episodes. Generally, 3V positive electrode materials, such as $Li_2Mn_4O_9$, $Li_4Mn_5O_{12}$, $V_2O_5$, $LiTiS_2$, and $LiMoO_2$ are suitable for use with polymer electrolytes.

Manganese oxides are of special interest because they are environmentally benign and low cost. Oxides such as $Li_2Mn_4O_9$ and $Li_4Mn_5O_{12}$ show good reversibility with capacities of about 200 mAh/g. Various methods are currently used to create positive electrodes from manganese materials. U.S. Pat. Nos. 4,980,251 and 5,240,794 disclose heating precursor materials comprising lithium, manganese and oxygen to form the positive electrode. U.S. Pat. No. 5,340,368 discloses mixing manganese oxide with monomers, an electronic conductor such as carbon, and lithium, then polymerizing the mixture to form the positive electrode material. U.S. Pat. No. 5,514,492 discloses dissolving a polymer in a solvent such as acetonitrile, mixing in carbon, lithium and manganese dioxide to form a slurry, and wherein the manganese dioxide is maintained in suspension after the solvent is removed. U.S. Pat. No. 5,614,331 discloses forming metal oxides, then subsequently mixing said metal oxides with a polymer solution to form electrodes. In these methods, the metal oxide is formed prior to mixing with the polymer limiting the minimum grain size that can be achieved. The manganese does not become bonded to the polymer, but rather remains in a separate phase from the polymer. In addition, good cycle life is observed only when these materials are charged and discharged at fairly low current densities (e.g. less than 0.5 $mA/cm^2$), due to lithium-ion transport limitations in the spinel structure. One solution to this problem is to decrease the particle size (thereby increasing the particle surface area) of the manganese and the polymer, shortening the solid-phase diffusion path. In addition to manganese, other transition metals have been used as electrode materials. Current methods of dispersing metal oxides (in powder form) in polymers do not achieve sufficiently small particle size of the transition metal in the polymer.

U.S. Pat. No. 5,523,179 discloses sulfur, polyethylene oxide and carbon dissolved or dispersed in acetonitrile to form a film for a positive electrode.

SUMMARY OF THE INVENTION

Objects of this invention are to provide transition metal electrodes for primary and secondary polymer electrolyte electrochemical cells enabling the cells to be charge/discharge cycled at higher current densities than currently available.

Electrodes for electrochemical cells require materials for ion storage, ion conduction, a source of mobile ions and electronic conduction. In the present invention, the electrode comprises a transition metal(s) as the ion storage material, a polymer as the ion conductor, alkali metal as the mobile ion source material and a suitable electronic conductor such as carbon, although electronically conductive polymers may also be used. The electrode material comprises a precipitation product of mixing a first solution comprising dissolved forms of a transition metal and a first polymer with a second solution comprising dissolved forms of an alkali metal and a second polymer. The transition metal is thus uniformly dispersed at the nanoscale in the polymers along with the alkali metal, wherein a salt of the transition metal has been oxidized (valence increased) directly in the polymers to form a complex with the polymers and alkali metal, and further comprising an electronic conductor material (such as carbon or graphite) intenstitially distributed in the transition metal, polymers, and alkali metal complex. The transition metal moiety is structurally amorphous, so no capacity fade should occur due to lattice expansion/contraction mechanisms. The small grain size, amorphous structure and homogeneous distribution provide improved charge/discharge cycling performance, and a higher initial discharge rate capability. The cells can be cycled at high current densities, limited only by the electrolyte conductivity. The electrode thus formed has a high initial discharge capacity, making it suitable for use in a primary battery. The nanoscale particle size of the transition metal and the amorphous nature of the transition metal complex with the polymers provides good charge/discharge cycling capability in the electrodes making them suitable in secondary battery applications as well. Both negative electrodes and positive electrodes may be formed of nanodispersed transition metals in polymers. For positive electrodes, the transition metal is preferably nickel, cobalt or manganese, with manganese being the most preferred. For negative electrodes, the transition metal is preferably titanium or iron. Suitable polymers include polyethers, polyimines, polythioethers, polyphosphazenes, polymer blends, copolymers, preferably those polymers with oxygen in the backbone. Of the polyethers, the polyalkylene oxides are most preferred, with polyethylene oxide (PEO) being the most preferred of the polyalkylene oxides. Polymers such as PVC and PAN, having high room-temperature lithium ionic conductivity are also preferred. The polymers may be solid-state or gel-state. Of the alkali metals, lithium is the most preferred.

Nanodisperse transition metal electrodes may be made as follows. A transition metal salt (preferably manganese nitrate) is dissolved in a first solution of polymer (preferably polyethylene oxide) and solvent (preferably acetonitrile). An alkali metal (preferably lithium hydroxide) is dissolved in a second solution of polymer (preferably polyethylene oxide) and solvent (preferably acetonitrile). The first and second solutions are combined and then stirred to form a precipitate in which the transition metal, alkali metal and polymers are all fully incorporated. The mixture is continued to be stirred until a stable suspension has been formed. An electronic conductor (preferably carbon black) is added to the mixture, which is stirred further. The solvent is removed by well known processes (preferably evaporation). The thin film formed is then suitable for use in an electrode.

DETAILED DESCRIPTION OF THE INVENTION

Abbreviations
C—carbon
cm—centimeter
deg C—temperature measured in degrees Celsius
EMD—electrolytic manganese dioxide
EO—ethylene oxide ($CH_2CH_2O$, MW=44)
eV—electron volt
FTIR—Fourier Transfer Infrared
g—gram
KBr—potassium bromide
Li—lithium
LiTFSI—trade name for lithium trifluoromethanesulfonimide $LiN(CF_3SO_2)_2$ from 3M Corporation
mAh—milliampere—hours
mm—millimeter
Mn—manganese
Mn/EO—mole of Mn/mol of EO
MW—molecular weight
nm—nanometer
N—nitrogen
NCC—nanodisperse composite cathode: manganese and lithium uniformly dispersed at the nanoscale in a polyethylene oxide polymer mixture, said mixture further comprising carbon black.
NTME—nanodispersed transition metal electrode: wherein a transition metal and an alkali metal have been uniformly dispersed at the nanoscale in a polymer mixture to form an amorphous material electrode for an electrochemical cell, said polymer mixture further comprising an electronic conductor. An NCC is one embodiment of an NTME.
O—oxygen
OCV—open circuit voltage
PEO—polyethylene oxide
PAN—polyacrylonitrile
PVC—polyvinyl chloride
PVDF—polyvinylidene fluoride
TFSI—see LiTFSI
XPS—Xray photoelectron spectroscopy
μm—micrometer
V—voltage
V vs. Li—voltage vs. a Li/Li+ reference electrode=−3.045 V vs. NHE (normal hydrogen electrode)

Definitions

The phrase "alkali metals" is herein defined as the alkali family of metals located in Group IA of the periodic table, including lithium (Li), sodium (Na), potassium (K), rubidium (Rb), cesium (Cs) and francium(Fr).

The phrase "transition metals" is herein defined to comprise elements located in groups IIIB, IVB, VB, VIB, VIIB, VIII, IB of the periodic table.

The term "gel-state" is herein defined to be a material containing at least 20% by weight of a liquid wherein said liquid is immobilized by the presence of a gelling agent.

The term "solid-state" is herein defined to be a material which contains less than 20% by weight of a liquid.

Nanodispersed Transition Metal Electrode (NTME)

In the present invention, an electrode for an electrochemical cell comprises a precipitation product of mixing a first solution comprising dissolved forms of a transition metal (ion storage material) and a first polymer (ion conductor) with a second solution comprising dissolved forms of an alkali metal (mobile ion source material) and a second polymer (ion conductor). The transition metal(s) is thus uniformly dispersed at the nanoscale in the polymers along with a mobile ion source material such as an alkali metal, wherein a salt of the transition metal has been oxidized (valence increased) directly in the polymer to form a complex with the polymer and alkali metal, and further comprising an electronic conductor material (such as carbon or graphite) dispersed in the complex. The transition metal moiety is structurally amorphous, so no capacity fade should occur due to lattice expansion/contraction mechanisms. The small grain size, amorphous structure and homogeneous distribution provide improved charge/discharge cycling performance, and a higher initial discharge rate capability. The cells can be cycled at high current densities, limited only by the electrolyte conductivity. The electrode thus formed has a high initial discharge capacity, making it suitable for use in a primary battery. The nanoscale particle size of the transition metal and the amorphous nature of the transition metal complex with the polymers provides good charge/discharge cycling capability in the electrodes making them suitable in secondary battery applications as well. Both negative electrodes and positive electrodes may be formed of nanodispersed transition metals in polymers. Of transition materials for use in negative electrodes, titanium and iron are preferred. Of the transition metals for use in positive electrodes, nickel, cobalt and manganese are preferred, with manganese being the most preferred. Manganese salts with anions that are compatible with the solvent and polymer provide improved manganese solubility and lead to electrodes with higher capacity. Soluble manganese salts such as $Mn(CF_3SO_3)_2$ and $Mn(N(SO_2CF_3)_2)_2$ should lead to an increase in the reversible capacity and a decrease in the irreversible capacity of the electrode. Suitable polymers include polyethers, polyimines, polythioethers, polyphosphazenes, polymer blends, copolymers, preferably those polymers with oxygen in the backbone. Of the polyethers, the polyalkylene oxides are most preferred, with polyethylene oxide (PEO) being the most preferred of the polyalkylene oxides. Polymers such as PVC and PAN, having high room-temperature lithium ionic conductivity are also preferred. The polymers may be solid-state or gel-state. Any gelling agent may be used in the gel-state polymer, including polyacrylonitrile, PVDF or PEO. Of the alkali metals, lithium is the most preferred. Carbon is preferred as the electronic conducting material, although electronically conductive polymers may also be used. In Nanodispersed Transition Metal Electrodes, preferred material weight percentages are: electronic conductor 5–40%, transition metal salt 10–70%, polymer 15–75% and mobile ion source material 10–70%. M
ethods of Making a Nanodispersed Transition Metal Electrode A transition metal salt (preferably manganese nitrate) is dissolved in a first solution of polymer (preferably polyethylene oxide) and solvent (capable of dissolving the transition metal salt and polymer, preferably acetonitrile); a mobile ion source material (preferably an alkali metal and most preferably lithium hydroxide) is dissolved in a second solution of polymer (preferably polyethylene oxide) and solvent (capable of dissolving the alkali metal salt and polymer, preferably acetonitrile). The first and second solutions are combined and then stirred to form a precipitate in which the manganese, lithium and polymer are all fully incorporated. The mixture is continued to be stirred until a stable suspension has been formed. An electronic conductor (preferably carbon black) is added to the mixture, which is stirred further. The solvent is removed by well known processes (preferably evaporation). The thin film formed is then suitable for use in an electrode.

Electrochemical Cell using Nanodispersed Transition Metal Electrodes

A first embodiment of an electrochemical cell comprises a NTME positive electrode, a lithium negative electrode, and polymer electrolyte (preferably PEO). In the positive electrode, the transition metal is preferably nickel, cobalt or manganese, with lithium as the alkali metal, PEO as the polymer, and carbon black as the electronic conductor.

A second embodiment of an electrochemical cell comprises a positive electrode, a NTME negative electrode, and a polymer electrolyte. In the NTME negative electrode, the transition metal is preferably titanium or iron.

Other embodiments provide for use of other polymers, alkali metals, and transition metals as listed earlier.

Assembling of electrochemical cell components using NTME may be accomplished by processes well known in the art.

EXAMPLE 1

NCC films suitable for use in a positive electrode were made by: a) preparing two homogenous solutions of 2 wt % of PEO (1,000,000 MW) in acetonitrile; b) dissolving a manganese salt, $Mn^{12}(NO_3)_2.H_2O$, in the first PEO/acetonitrile solution; c) dissolving a lithium salt ($LiOH.H_2O$) in the second PEO/acetonitrile solution; d) mixing the two PEO/acetonitrile solutions together by stirring to form a brown precipitate; e) continuing to stir the PEO/acetonitrile mixture for two days until the reaction was complete and the stable suspension was quite brown; f) adding carbon black in the amount of 10 wt % of the solid components; g) stirring the resulting mixture for two additional days; h) casting the mixture onto a non-stick coated glass plate; i) evaporating the solvent from the mixture for one day, then subsequently drying under vacuum at 60 deg C for 2 to 10 hours depending on the sample, to form self-supporting films. The dried films were transferred immediately to a helium filled glove box. The dried self-supporting electrodes were 75–100 $\mu$m thick, weighed 10–15 mg/cm$^2$ and were paper-like. Performance results for these films are shown in Table 1 with the "B" designation.

EXAMPLE 2

NCC films were also prepared as in example 1 except that LiTFSI in varying amounts, (EO/LiTFSI ratios varying from 8/1 to 189/1), was also added with the carbon black. These films required significantly longer drying times, (drying times requiring up to a week or two) and were difficult to work with because of their elastomeric nature, although performance was comparable to other NCC films. Performance results for these films are shown in Table 1 with the "A" designation.

TABLE 1

Compositions and first discharge performance for the NCC positive electrode films

| Sample # | Mn/EO | Li/EO | Li/Mn | Average OCV (V vs. Li) | 1st cycle discharge mAh/g |
| --- | --- | --- | --- | --- | --- |
| 2A | 0.26 | 0.13 | 0.49 | 3.75 | 40 |
| 5A | 0.40 | 0.43 | 1.07 | 3.72 | 172 |
| 7B | 0.45 | 0.50 | 1.12 | 3.62 | 92 |
| 8B | 0.45 | 0.76 | 1.68 | 3.49 | 65 |
| 9B | 0.45 | 1.02 | 2.27 | X | X |
| 10B | 0.45 | 0.43 | 0.75 | 3.59 | 74 |
| 11B | 0.45 | 0.25 | 0.57 | 3.68 | 143 |
| 12B | 0.45 | 0.17 | 0.37 | 3.55 | 178 |
| 13B | 0.67 | 0.76 | 1.12 | 3.67 | 120 |
| 14B | 0.30 | 0.37 | 1.25 | 3.68 | 77 |
| 15B | 0.30 | 0.57 | 1.92 | 2.95 | 28 |

Example 1 and 2 Film Characterization And Performance Results

The films were characterized with Xray diffraction with a Siemens D-5000 diffractometer using Cu—K$\alpha$ radiation.

Xray photoelectron spectroscopic (XPS) analysis was carried out on the films using the PHI 5300 system with a magnesium target negative electrode. Dried film samples were mounted in an air-tight XPS sample holder inside the glove box. To minimize the charging anticipated with an organic sample during the XPS analysis, films were attached with screws to a metallic substrate.

FTIR transmission spectra were recorded on the films as well as various combinations of the precursor materials. The PEO-containing samples were cast directly onto 13 mm diameter AgCl discs in air. The films were vacuum-dried at 60 deg C for three days, and then transferred to a helium (He)-filled glove box where they were mounted between two AgCl windows in an air-tight FTIR sample holder. Background spectra of the AgCl windows were recorded before and after the spectra of the films were recorded. A powder spectrum of $Mn(NO_3)_2.4H_2O$ was obtained using the KBr pellet method. Pure KBr provided the background spectrum. Film thicknesses and KBr pellet concentrations were controlled so that the maximum absorbance was about 1.0%. Transmission spectra were obtained using an ATI Mattson Research Series 1 FTIR with a DGTS detector. The spectral resolution was 4 cm$^{-1}$. The spectra were taken over the range of 4000 to 400 cm$^{-1}$. The data acquisition and manipulation were carried out using WinFIRST software from Mattson.

Figure 1:
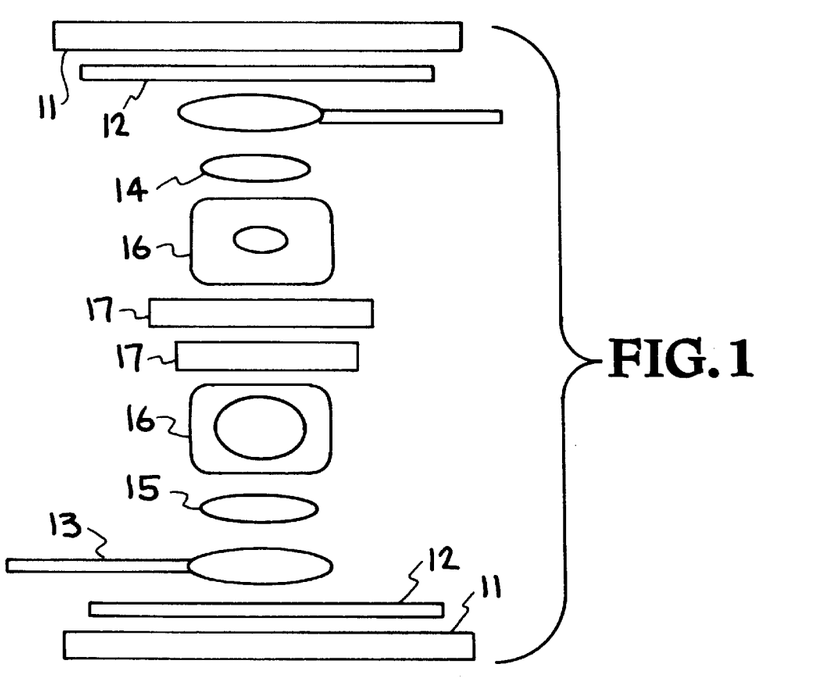
FIG. 1 illustrates the flat-plate cell used to test the NCC.

Electrochemical measurements of the films versus lithium were carried out primarily in a flat plate cell, a schematic of which is shown in FIG. 1. Cells were assembled in an inert atmosphere with two stainless steel foil current collectors 13 (50 $\mu$m), a lithium foil negative electrode 15 (125 $\mu$m), two masks 16, and two layers of 25 $\mu$m thick PEO/LiTFSI polymer electrolyte 17 with Li/EO of 8:1. The use of two electrolyte layers is helpful in minimizing dendrite formation and/or shorting caused by air bubbles or pin-holes in the electrolyte film. Polyethylene film masks were used on both sides of the electrolyte to define the active area at 0.785 cm$^2$. Cell components were assembled with Mactac adhesive 12 and the glass endplates 11 were clamped together and heated to 85 deg C in an oven inside the glove box. Some positive electrode films 14 were tested using electrolytes made with $LiCF_3SO_3$ and a temperature of 105 deg C. The electrochemical measurements were performed using an Arbin multi-channel-battery testing system (8 channels), controlled by a PC computer.

Results and Discussion

The different compositions used to synthesize the NCC films are summarized in Table 1. The highest Mn concentration represents the solubility limit for manganese nitrate in the PEO/acetonitrile solution. $Mn(CH_3COOH)_2$, $Mn(ClO_4)_2$ and $MnCO_3$ were found to not dissolve to any appreciable degree in the PEO/acetonitrile solution and were not investigated further. $Mn(CF_3SO_3)_2$ and/or $Mn(TFSI)_2$ should yield interesting results in this synthesis since they should be chemically compatible with PEO/acetonitrile and the large anions should intensify the amorphous nature of the polymer and manganese compound.

Figure 2:
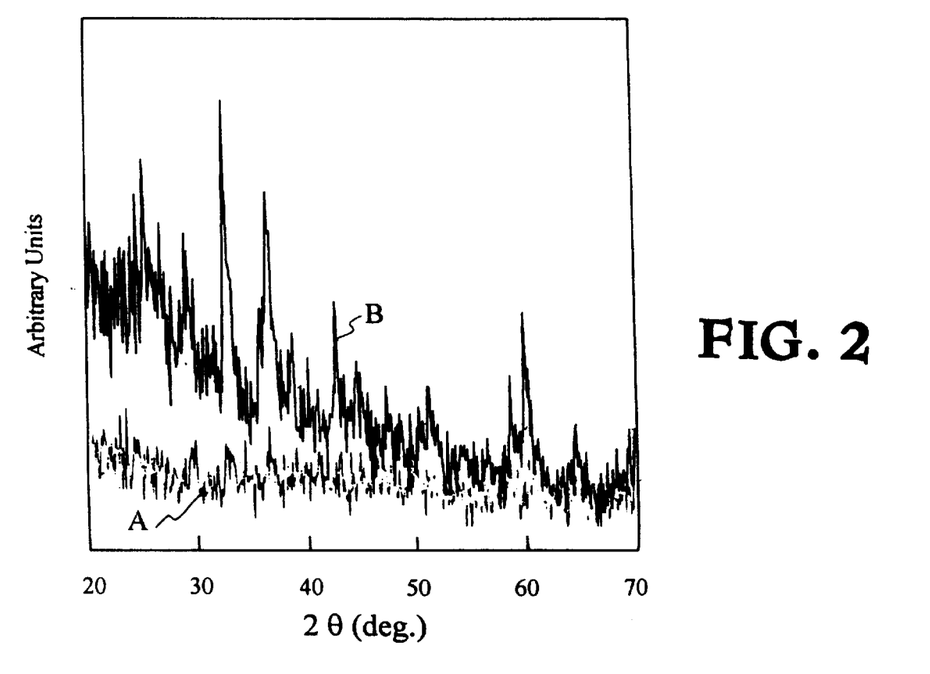
FIG. 2 illustrates Xray diffraction patterns of the NCC sample #2A as—prepared (curve A) and NCC sample #7B after 9 months storage in a helium (He) atmosphere glovebox (curve B).

The Xray diffraction pattern recorded on an NCC (2A) containing added LiTFSI is shown in FIG. 2, curve A. Also shown is a pattern from an used NCC (7B) film which had been stored in an inert atmosphere for 9 months, curve B. The as-prepared film was completely amorphous. The lack of definition in the Xray diffraction pattern suggest that the size of any crystalline component is less than about 10 nm. After sitting, the NCC was found to develop some structure, however, the crystalline species was not identified.

Figure 3A:
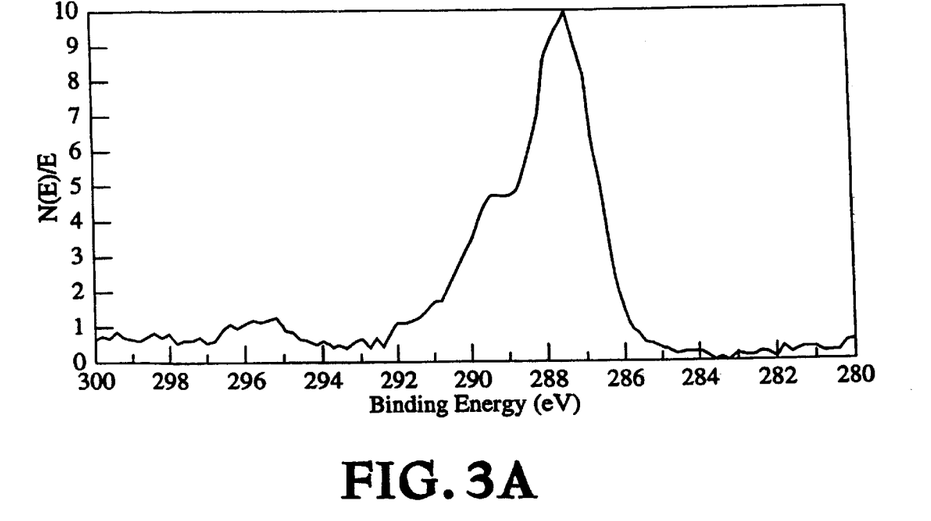
FIG. 3A illustrates limited energy region Xray Photoelectron spectra of NCC sample #5A; Is orbital of the carbon atom, (C 1 s).
Figure 3B:
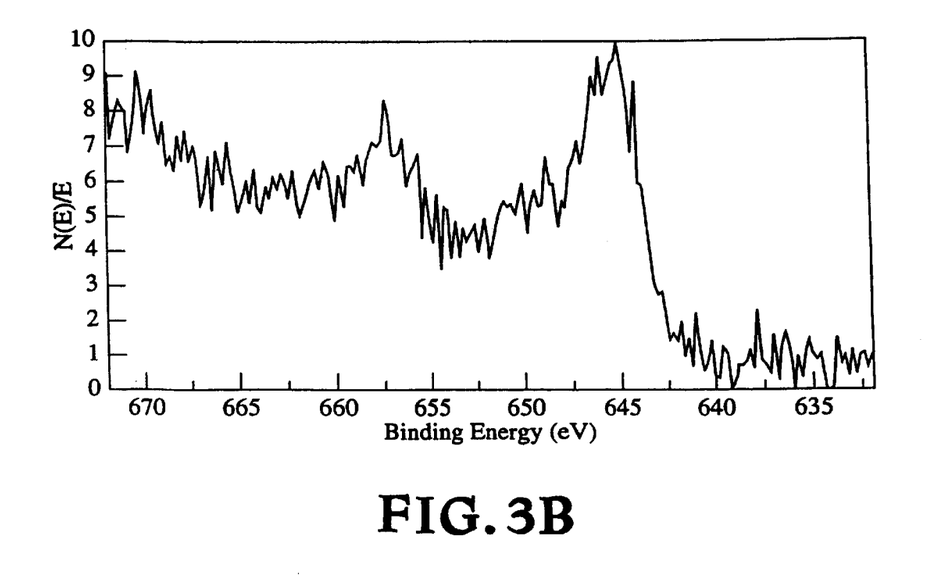
FIG. 3B illustrates limited energy region Xray Photoelectron spectra of NCC sample #5A; 2 $p_{3/2}$ orbital of the manganese atom, (Mn 2 $p_{3/2}$).
Figure 4A:
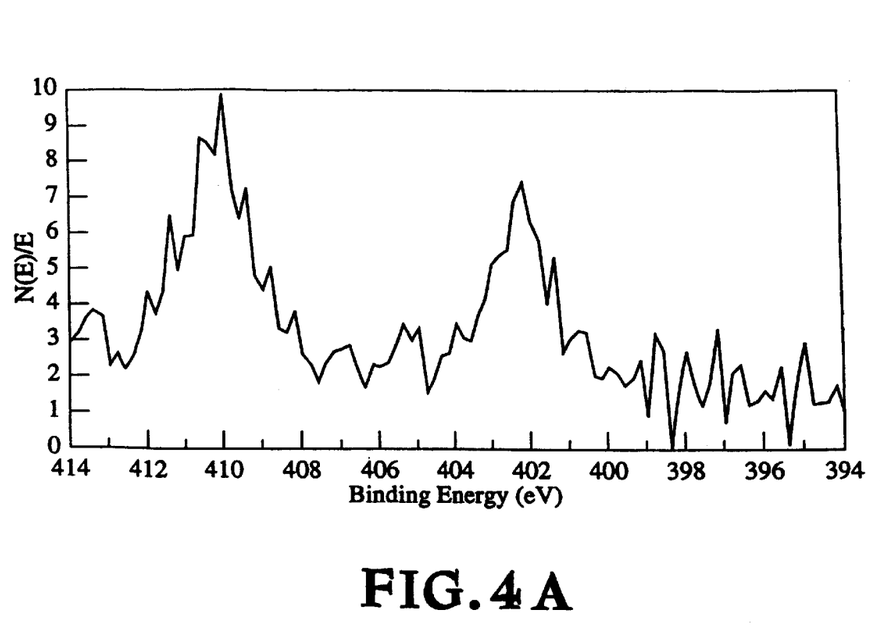
FIG. 4A illustrates limited energy region Xray Photoelectron spectra of NCC sample #5A; is orbital of the nitrogen atom,(N 1 s).
Figure 4B:
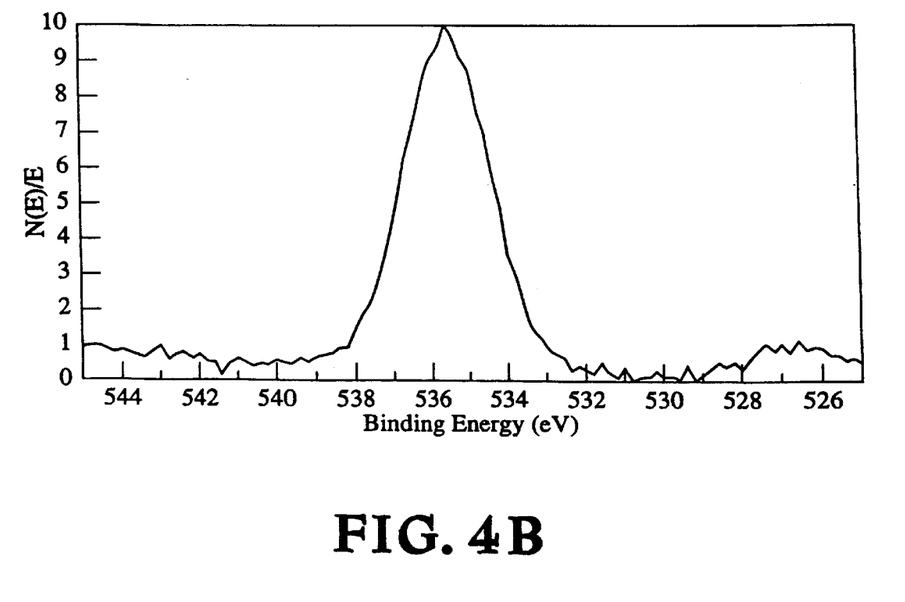
FIG. 4B illustrates limited energy region Xray Photoelectron spectra of NCC sample #5A; is orbital of the oxygen atom, (O 1 s).

XPS and FTIR analysis of sample 5A in Table 1 were carried out in detail. Raw Xray photoelectron spectra for the pertinent energy ranges are shown in FIGS. 3A, 3B, 4A and 4B. In FIG. 3A, a very strong carbon atom orbital (C 1 s) peak occurs at 287.4 eV due to the presence of the carbon black. This value is high for pure carbon, indicating that the sample is charging to about 2.3 eV during the measurement. The peak positions for the spectra in FIGS. 3A, 3B, 4A and 4B have been corrected for charging and are summarized in Table 2 along with their tentative assignments. FIG. 3B shows the Mn portion of the spectrum. The manganese atom 2 $p_{3/2}$ (Mn 2 $p_{3/2}$) peak is located at 642.4 eV (after correction for charging) implying that the Mn has a valence close to 4+. Therefore, $Mn^{2+}$ from the nitrate salt is being chemically oxidized during synthesis. Lithium peaks were not observed in these spectra. This is expected since the concentration of lithium is small (about 2 wt %) and lithium has an extremely low cross-section in this experiment. The relative intensities in the 1 s orbital of the nitrogen atom, (N 1 s) binding energy range (FIG. 4A) show a large peak at 407.4 eV, characteristic of $N^{+5}$ in $NaNO_3$, a smaller peak at 399.7 eV and a weak third peak at a corrected energy of 402.2 eV. The smaller peak is characteristic of the $N^{-3}$ in an R—$NH_2$ group. This could be due to $HN(CF_3SO_2)_2$ which may be present as an impurity in LiTFSI. The smallest peak is probably due to $NO_2$—. The is orbital of the oxygen (O 1 s) spectrum (see FIG. 4B) consists of a main peak at about 532.8 and a small shoulder at around 532.2. The main peak is probably due to the nitrates and the smaller one may be due to O—Li, as has been shown for EMD samples or it may be due to the oxygen in the PEO backbone. It is clearly not due to an inorganic O—Mn which should appear at significantly lower energy, i.e. around 530 eV.

TABLE 2

Summary of Xray Photoelectron Spectroscopy data for NCC (5A)

| Measured Binding Energy (eV) | Corrected Binding Energy (eV) | Source | Match |
|---|---|---|---|
| 287.4 | 284.6 | C 1s | graphite |
| 645.2 | 642.3 | Mn 2p$_{3/2}$ | $MnO_2$ |
| 410.0 | 407.2 | N 1s | nitrate |
| 402.3 | 399.5 | N 1s | organic amine |
| 405.2 | 402.4 | N 1s | nitrite |
| 535.6 | 532.8 | O 1s | nitrate |

Figure 5:
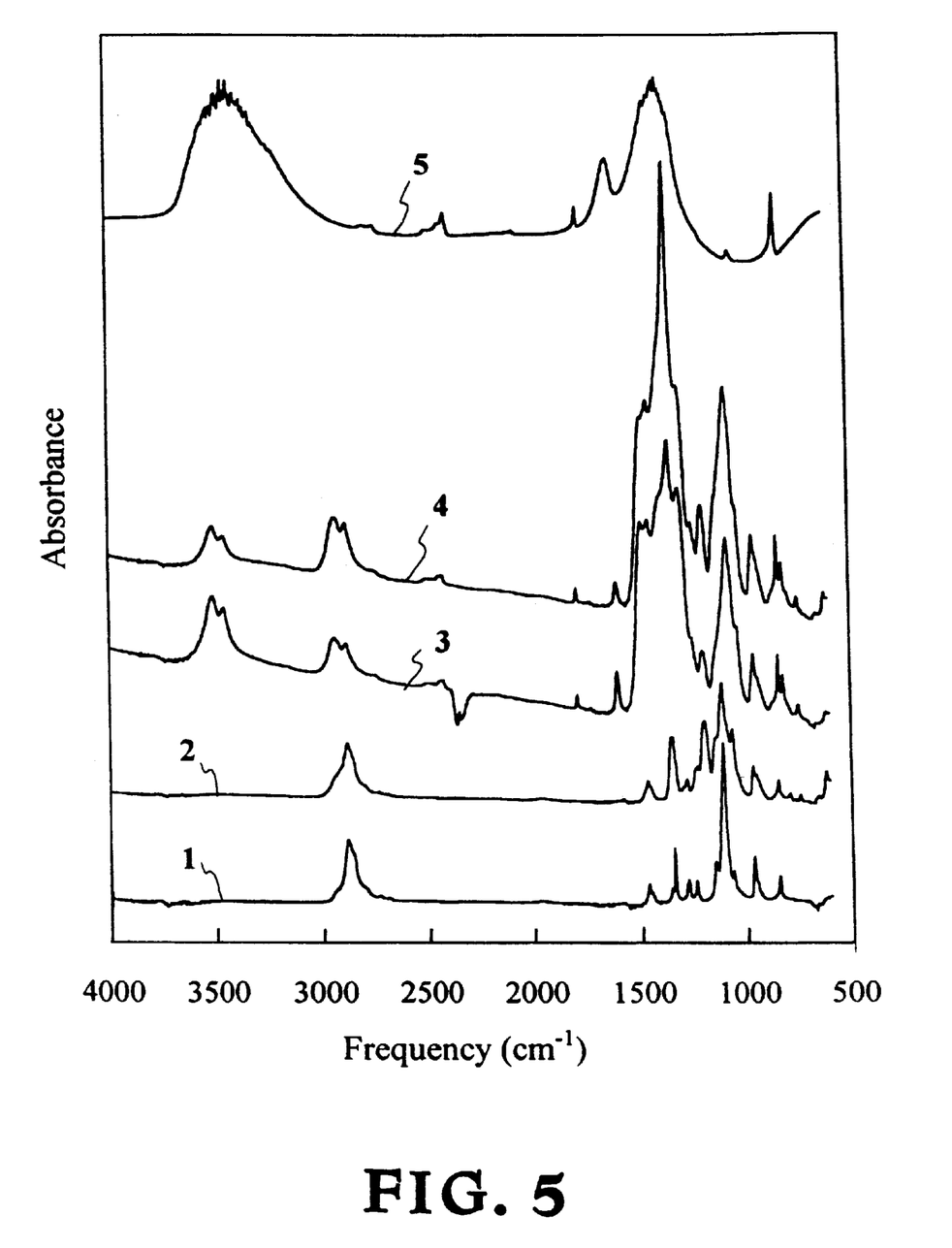
FIG. 5 illustrates FTIR spectra of NCC sample #5A and several precursor combinations: (curve 1) pure PEO, (curve 2) PEO+LiOH+LiTFSI, (curve 3) NCC, (curve 4) PEO+Mn $(NO_3)_2$, (curve 5) $Mn(NO_3)_2.H_2O$.

FIG. 5 shows an FTIR spectrum of sample 5a, along with spectra from precursor films with different combinations of the chemical components used to prepare sample 5a: (curve 1) pure PEO, (curve 2) PEO+LiOH+LiTFSI, (curve 3) NCC, (curve 4) PEO+$Mn(NO_3)_2$, (curve 5) $Mn(NO_3)_2.H_2O$. The PEO+LiOH+LiTFSI and the PEO+$Mn(NO_3)_2$ films had the same component ratios as the NCC shown. The spectrum for pure $(Mn(NO_3)_2.4H_2O$ is also shown. The presence of $Mn(NO_3)_2$ in PEO either alone or as a component of the NCC changes the PEO absorption spectrum dramatically.

Figure 6A:
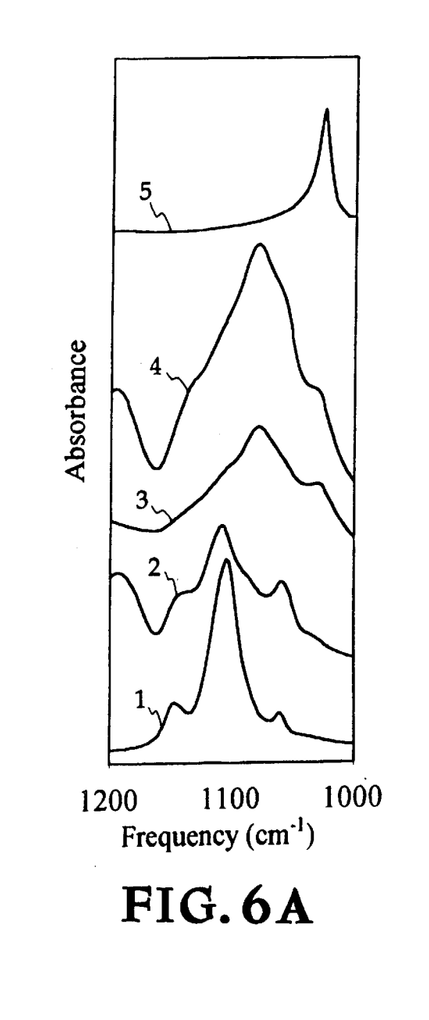
FIG. 6A illustrates FTIR spectra of C—O stretch, number designations the same as FIG. 5.
Figure 6B:
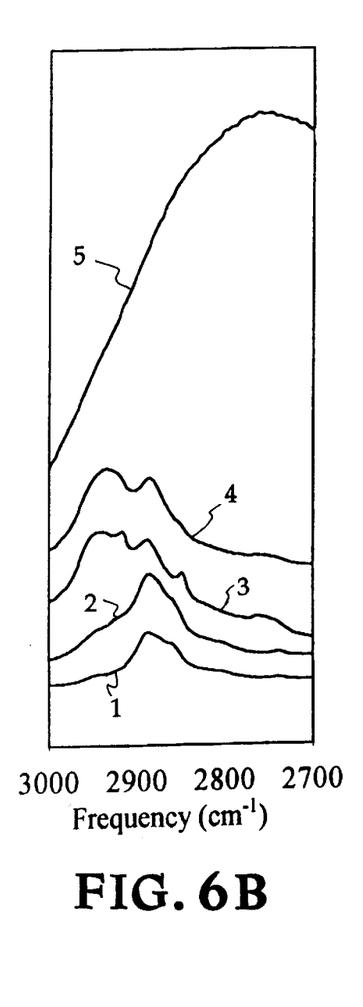
FIG. 6B illustrates FTIR spectra of C—H stretch, number designations the same as FIG. 5.
Figure 6C:
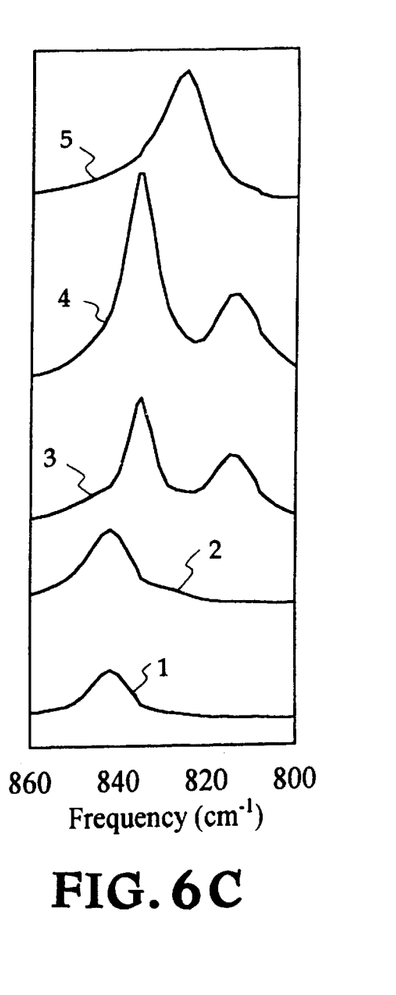
FIG. 6C illustrates FTIR spectra of C—H rocking, number designations the same as FIG. 5.

FIGS. 6A–C show several regions of the PEO spectra at higher magnification, (the curve number designations being the same as in FIG. 5). FIG. 6A illustrates FIIR spectra of C—O stretch; the C—O—C asymmetric stretch vibration mode shifts from 1100 cm$^{-1}$ to 1060 cm$^{-1}$ when $(Mn(NO_3)_2$ is present in the film. This behavior is not apparent for the PEO/LiOH/LiTFSI mixture. We attribute this change to complexation between Mn and the O in the PEO. FIG. 6B illustrates FTIR spectra of C—H stretch; the $CH_3$ stretch vibration mode located around 2850 cm$^{-1}$ splits visibly into two broad peaks, consistent with the idea of a strong interaction between Mn and O in PEO. This same behavior is observed for the 800 to 860 cm$^{-1}$ region in FIG. 6C, which shows FTIR spectra of C—H rocking. Previous FTIR studies of the PEO/LiTFSI system show similar changes in the PEO spectrum after the addition of LiTFSI to the PEO-based solution, but this change is relatively small compared to what is observed with PEO/Mn(NO$_3$)$_2$. Most importantly, this characteristic does not disappear with the addition of LiOH to make the NCC. In spite of the precipitation from the polymer solution, a strong complex bond between the polymer and the Mn persists. This indicates that the novel positive electrode reaction is a polymer-assisted process involving a homogenous chemical reaction. The Mn(OH)$_2$ that will form upon mixing LiNO$_3$ and Mn(NO$_3$)$_2$ may be reacting further to a highly oxidized, polymer stabilized MnO$_2$.

Another important characteristic for the PEO/Mn(NO$_3$)$_2$/LiOH/LiTFSI system is the double peak located around 3450 cm$^{-1}$, which is more pronounced than that for the PEO/Mn(NO$_3$)$_2$ system. This double peak may be due to either an Mn—OH bond, an N—H bond or even H$_2$O. The Mn—OH bond is expected from the precipitation in the PEO/Mn(NO$_3$)$_2$/LiOH/LiTFSI solution, but Mn(OH)$_2$ is not air-stable and will oxidize to a black precipitate of Mn$_2$O$_3$ or MnO$_2$. Films that were prepared without added carbon retained their brown color indefinitely. The N—H bond is consistent with the observation of N as an amine in the XPS data. It has been suggested that LiTFSI is often contaminated with trace amounts of amine. However, this peak was never observed in FTIR of PEO/LiTFSI electrolyte even at very high LiTFSI concentrations. We rule out the formation of NH$_3$ during the formation process since it would most likely be lost during vacuum drying of the films and a chemical analysis of prepared films confirmed no nitrogen was lost during the synthesis. Addition of an amine group to the PEO backbone would most likely lead to chain scission, since the number of end-groups in a polymer with 1,000,000 MW will be quite small. Analysis of the effect of the synthesis on the molecular weight distribution of this high MW polymer was not carried out.

Electrochemical studies

The NCC formulations tested are summarized in Table 1. The films with the A designation were synthesized with decreasing amounts of electrolyte salt (LiTFSI) added to the mix leading to improved performance. The LiTFSI was omitted in the series B films which therefore dried faster and were less sticky and easier to work with. The cells constructed with the NCC seemed somewhat more prone to dendrite formation than cells made with Li$_2$Mn$_4$O$_9$ powders. Also, dendrite formation was more severe for the series B formulations without LiTFSI. Table 1 shows the initial open circuit voltage against lithium and the capacity delivered on the first discharge, as mAh per gram of positive electrode film weight for several NCC's. The specific capacity based on the weight of the active material is unknown since the structure of the active material is unknown.

Figure 7:
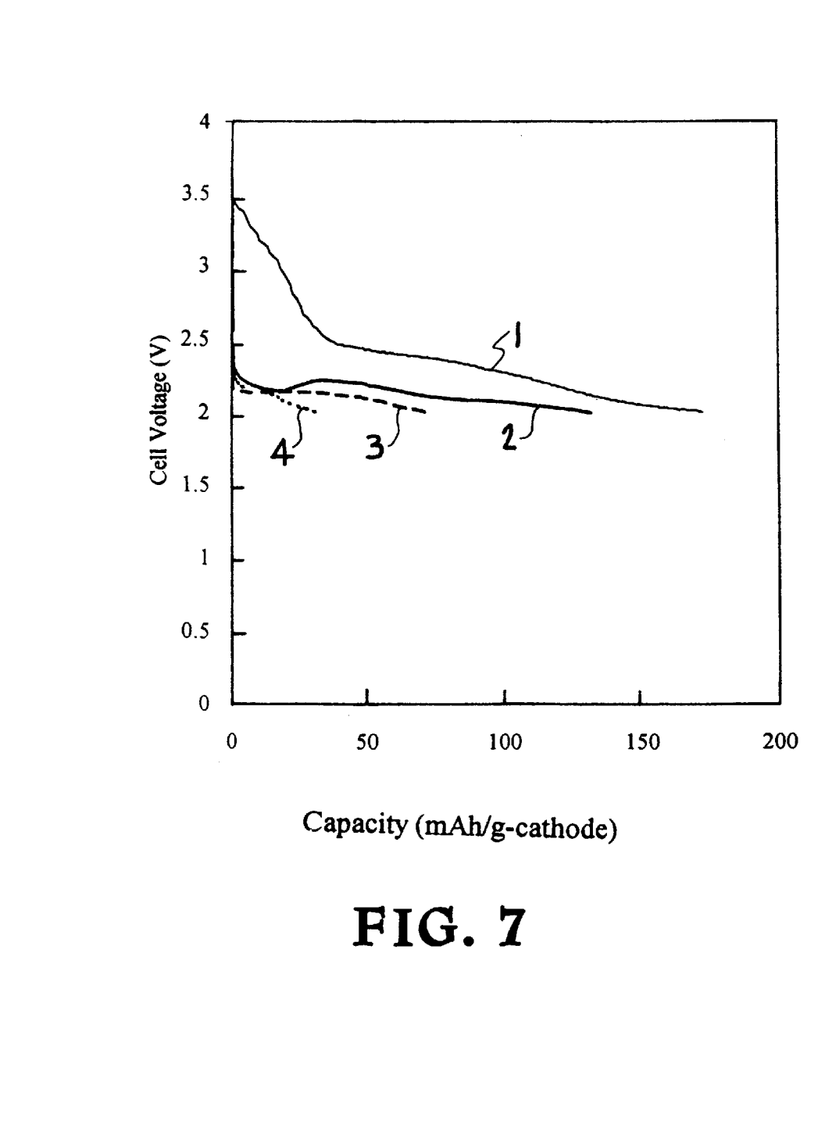
FIG. 7 illustrates first-cycle discharge voltage profiles for three compositions of NCC. Curve 1 (Li/Mn=1, sample #5a), Curve 2 (Li/Mn=0.4, sample #12B), Curve 3(Li/Mn= 1.1, sample #13B), and Curve 4 (Li/Mn=1.7, sample #8B).
Figure 8:
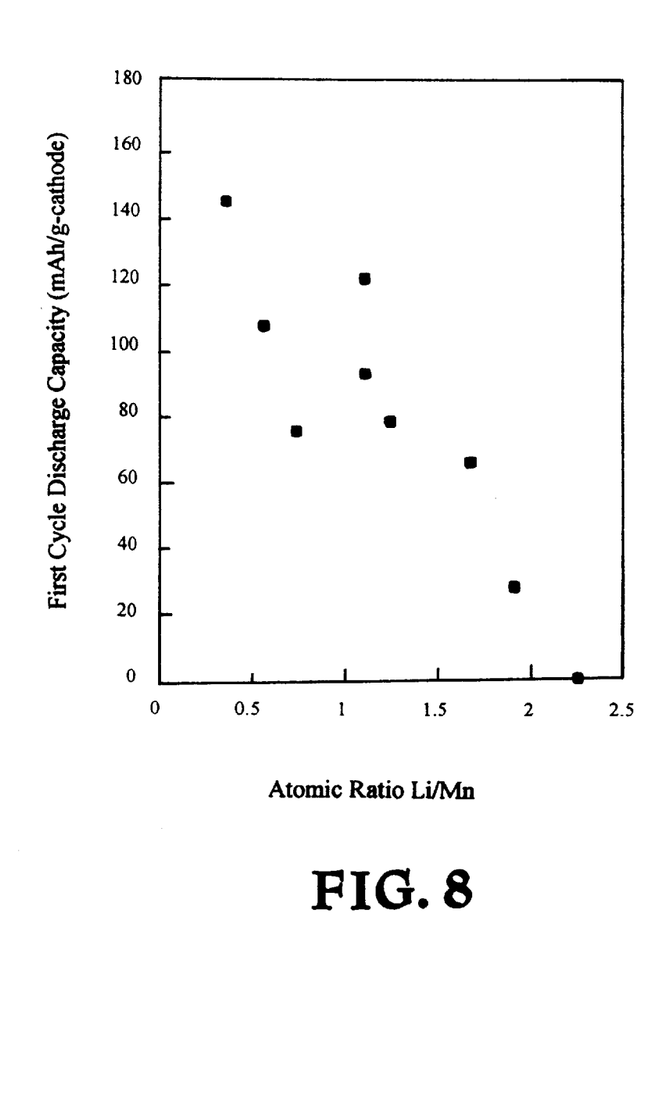
FIG. 8 illustrates first-cycle discharge capacity dependence on NCC composition.

Cells with NCC positive electrodes and lithium negative electrodes were typically discharged at 0.2 mA/cm$^2$ to a voltage of 2.0 V vs. Li/Li+. In all cases, the capacity delivered on the first discharge was significantly larger than that delivered on succeeding cycles. Open circuit voltages for most compositions were 3.5 to 3.7 V vs. Li/Li$^+$ with no significant correlation with initial lithium content. First cycle discharge profiles are shown in FIG. 7 for three compositions of NCC containing different amounts of lithium: Curve 1 (Li/Mn=1, sample #5a), Curve 2 (Li/Mn=0.4, sample #12B), Curve 3 (Li/Mn=1.1, sample #13B), and Curve 4 (Li/Mn=1.7, sample #8B). The capacity of the first discharge is roughly inversely proportional to the initial Li/Mn ratio in the electrode, as shown in FIG. 8. This trend was only observed in the films prepared without LiTFSI. One film (7B) delivered 340 mAh/g positive electrode when discharged with a PEO/LiCF$_3$SO$_3$ electrolyte at 105 deg C. This corresponds to 6 equivalents per mole of manganese in the film. A large part of the initial discharge process must be due an irreversible reaction taking place at a voltage of about 2.2 V vs. Li/Li$^+$. Thus transition metal nitrates may be more preferred in the fabrication of primary electrochemical cell electrodes, and less preferred in the fabrication of secondary electrochemical cell electrodes. A large part of this is probably due to the reduction of the nitrate remaining in the film to nitrite according to $$NO_3^- + H_2O + 2e^- \rightarrow NO_2^- + 2OH^- \quad E°=2.23V \text{ vs. Li/Li}^+ \qquad \text{Equation 1}$$

The maximum amount of nitrate available for this reaction will be 2 moles of NO$_3^-$ per mole of Mn, or 4 equivalents per mole of Mn. The trend noted in FIG. 8 can then be explained by the participation of the nitrate in the chemical preparation reaction. The addition of more LiOH to original mix will result in more Mn(OH)$_2$ to be oxidized by NO$_3^-$, thereby reducing the amount of nitrate available during the subsequent electrochemical formation.

Figure 9:
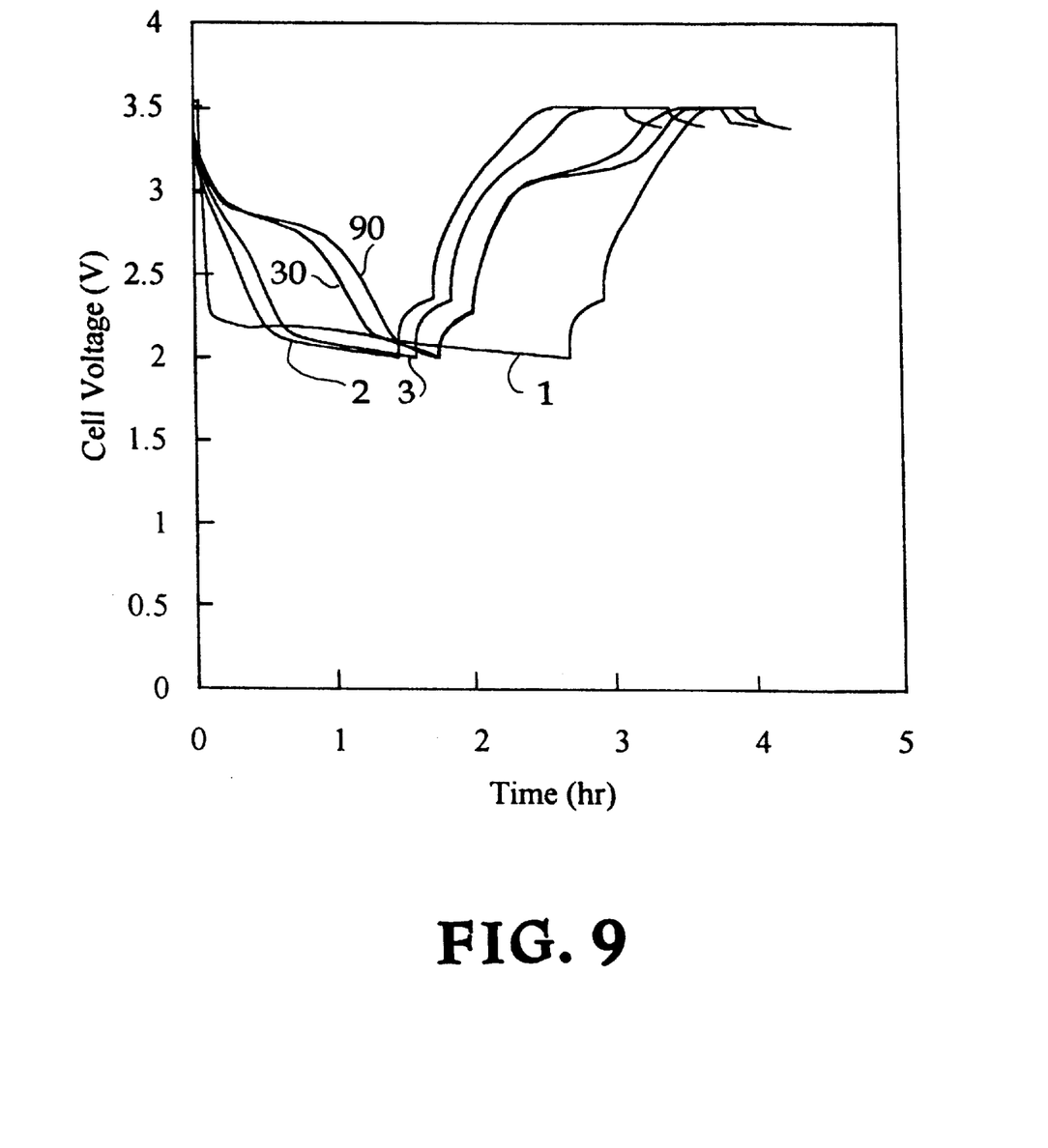
FIG. 9 illustrates voltage profiles for cycles 1–3, 30 and 90 during constant current cycling of NCC (Sample #8B), ±0.2 mA/cm².

FIG. 9 illustrates voltage profiles for cycles 1–3, 30 and 90 during constant current cycling of NCC (Sample #8B), ±0.2 mA/cm$^2$ (curve numbers corresponding to cycle number). The voltage profiles shown in FIG. 9 change steadily upon cycling. The decrease in the irreversible portion of the profile is consistent with the consumption of nitrate in the film. The reversible process, due to the oxidation and reduction of a complex form of Mn$^{4+}$ (or Mn$^{3+}$), should yield a sloping profile. This is masked in early cycles by the irreversible formation process. It appears that this profile may evolve though this sloping profile stage (in early cycles) but the final shape of the profile more closely resembles that observed when cycling spinel forms of lithium manganese oxide such as Li$_2$Mn$_4$O$_9$.

Figure 10:
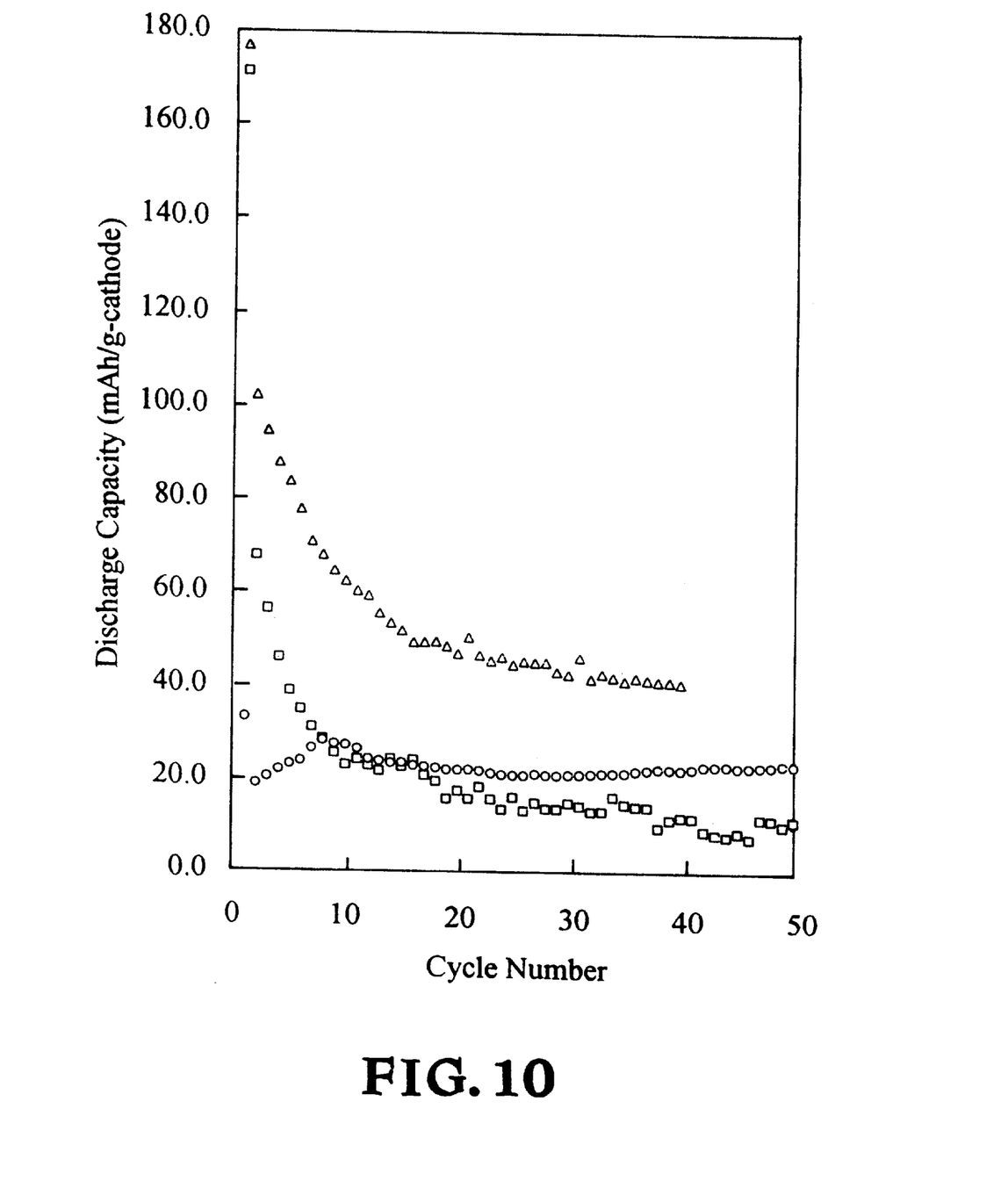
FIG. 10 illustrates long term cycling tests of three compositions of NCC: Curve 1 (sample #5A), Curve 2 (sample #8B), Curve 3 (sample #12B), ±0.2 mA/cm², see Table 1 for complete compositions.

Several formulation were subjected to continuous cycling at constant currents of ±0.1 or 0.2 mA/cm$^2$, with taper charging, between voltage limits of 2 and 3.5 V vs. Li/Li$^+$. FIG. 10 illustrates long term cycling tests of three compositions of NCC: Curve 1 (sample #5A), Curve 2 (sample #8B), Curve 3 (sample #12B), ±0.2 mA/cm$^2$. The best capacity of the NCC is comparable to a convention polymer positive electrode loaded with 30 wt % Li$_2$Mn$_4$O$_9$ and 10% carbon. Such an electrode will deliver 64 mAh/g of total positive electrode weight as a theoretical maximum (212 mAh/g). A correlation between the reversible discharge capacity and manganese composition has not yet been determined. The use of more soluble Mn salts, such as Mn(CF$_3$SO$_3$)$_2$ or Mn(N(SO$_2$CF$_3$)$_2$)$_2$, in the formulation should lead to an increase in the reversible capacity and probably a decrease in the irreversible capacity of the NCC.

During the synthesis, the manganese starting material (II) is oxidized to manganese (IV), which complexes with the PEO. First cycle discharge capacities as high as 340 mAh/g positive electrode film have been recorded. This capacity declines steadily during the first few cycles during a formation process until steady capacities as high as 50 mAh/g positive electrode are reached.

Obviously numerous modifications and variations of the present invention are possible in the light of the above teachings. It is therefore to be understood that within the scope of the appended claims the invention may be practiced otherwise than as specifically described therein.

What is claimed is:

1. An electrode for an electrochemical cell, said electrode comprising:

a) a precipitation product of mixing a first solution comprising dissolved forms of a transition metal and a first polymer with a second solution comprising dissolved forms of an ion source material and a second polymer, throughout which the transition metal, ion source material and polymers have been uniformly dispersed, b) wherein said precipitation product comprises an amorphous complex of nanoscale particle size transition metal, polymers and ion source material, said transition metal having been oxidized during the precipitate synthesis process;

c) and further comprising an electronically conductive material dispersed within said complex.

2. An electrode as recited in claim 1, wherein said electrochemical cell is a primary cell.

3. An electrode as recited in claim 1, wherein said electrochemical cell is a secondary cell.

4. An electrode as recited in claim 1, wherein said polymer is a solid state polymer.

5. An electrode as recited in claim 1, wherein said polymer is a gel-state polymer.

6. An electrode as recited in claim 1, wherein said ion source material is an alkali metal.

7. An electrode as recited in claim 6, wherein said alkali metal is lithium.

8. An electrode as recited in claim 1, wherein said polymer is selected from the group consisting of polyethers, polyimines, polythioethers, polyphosphazenes, polymer blends of the foregoing four polymers, copolymers of the foregoing four polymers, and polymers with oxygen in the backbone.

9. An electrode as recited in claim 8, wherein said polyether polymer is a polyalkylene oxide.

10. An electrode as recited in claim 9, wherein said polyalkylene oxide is polyethylene oxide.

11. An electrode as recited in claim 1, wherein said polymer is polyacrylonitrile.

12. An electrode as recited in claim 1, wherein said polymer is polyvinyl chloride.

13. An electrode as recited in claim 1, wherein said electrode is a positive electrode.

14. An electrode as recited in claim 13, wherein said transition metal is selected from the group consisting of nickel, cobalt and manganese.

15. An electrode as recited in claim 1, wherein said electrode is a negative electrode.

16. An electrode as recited in claim 15, wherein said transition metal is selected from the group consisting of iron and titanium.

17. An electrode as recited in claim 1, wherein said electronically conductive material is carbon.

18. An electrode as recited in claim 1, wherein said electronically conductive material is an electronically conductive polymer.

19. An electrode as recited in claim 1 wherein said transition metal is between about 10% to about 70% in percent by weight.

20. An electrode as recited in claim 1 wherein said polymer is between about 15% to about 75% in percent by weight.

21. An electrode as recited in claim 1 wherein said electronically conductive material is between about 5% to about 40% in percent by weight.

22. A method of making an electrode for an electrochemical cell, said method comprising the steps of:

a) dissolving a first polymer in a first solvent to form a first solution;

b) dissolving a second polymer in a second solvent to form a second solution;

c) dissolving a transition metal salt in said first solution;

d) dissolving an ion source material in said second solution;

e) combining said first and second solutions to form a mixture;

f) stirring said mixture to form a precipitate;

g) stirring said mixture until a stable suspension is formed;

h) adding electronic conductive material to said mixture;

i) stirring said mixture to incorporate said electronic conductive material;

j) and removing said first and second solvents from said mixture to form a film.

23. The method as recited in claim 22, wherein said solvents removal step is accomplished by evaporation.

24. The method as recited in claim 22, wherein said polymer dissolving steps comprise dissolving solid state polymers.

25. The method as recited in claim 22, wherein said polymer dissolving steps comprise dissolving polymers selected from the group consisting of polyethers, polyimines, polythioethers, polyphosphazenes, polymer blends of the foregoing four polymers, copolymers of the foregoing four polymers, and polymers with oxygen in the backbone.

26. The method as recited in claim 25, wherein said polymer dissolving steps comprise dissolving polyalkylene oxide.

27. The method as recited in claim 26, wherein said polymer dissolving steps comprise dissolving polyethylene oxide.

28. The method as recited in claim 22, wherein said polymer dissolving steps comprise dissolving polyacrylonitrile.

29. The method as recited in claim 22, wherein said polymer dissolving steps comprise dissolving polyvinyl chloride.

30. The method as recited in claim 22, wherein said ion source material dissolving step comprises dissolving an alkali metal as the ion source material.

31. The method as recited in claim 30, wherein said ion source material dissolving step comprises dissolving lithium as the alkali metal.

32. The method as recited in claim 22, wherein said transition metal dissolving step comprises dissolving a transition metal selected from the group consisting of nickel, cobalt and manganese.

33. The method as recited in claim 22, wherein said transition metal dissolving step comprises dissolving a transition metal selected from the group consisting of iron and titanium.

34. The method as recited in claim 22, wherein said electronically conductive material addition step comprises adding carbon as the electronically conductive material.

35. The method as recited in claim 22, wherein said electronically conductive material addition step comprises adding an electronically conductive polymer as the electronically conductive material.

36. An electrochemical cell comprising:

a) a positive electrode made in accordance with the method as recited in claim 22;

b) a negative electrode;

c) and an ionically conductive material disposed between and in physical contact with said positive and negative electrodes.

37. An electrochemical cell as recited in claim 36 wherein said ion source material is an alkali metal.

38. An electrochemical cell as recited in claim 36 wherein said transition metal is selected from the group consisting of nickel, cobalt and manganese.

39. An electrochemical cell as recited in claim 36 wherein said ionically conductive material is a polymer electrolyte.

40. An electrochemical cell as recited in claim 36 where said negative electrode is a lithium electrode.

41. An electrochemical cell comprising:
  a) a positive electrode;
  b) a negative electrode made in accordance with the method as recited in claim 22;
  c) and an ionically conductive material disposed between and in physical contact with said positive and negative electrodes.

42. An electrochemical cell as recited in claim 41 wherein said ion source material is an alkali metal.

43. An electrochemical cell as recited in claim 41 wherein said transition metal is selected from the group consisting of iron and titanium.

44. An electrochemical cell as recited in claim 41 wherein said ionically conductive material is a polymer electrolyte.

* * * * *